United States Patent [19]

Naujokas

[11] Patent Number: 5,639,144
[45] Date of Patent: Jun. 17, 1997

[54] ENERGY ABSORBING CHILD SEAT FASTENER

[75] Inventor: Gerald John Naujokas, Canton, Mich.

[73] Assignee: Ford Motor Company, Dearborn, Mich.

[21] Appl. No.: 266,391

[22] Filed: Jun. 27, 1994

[51] Int. Cl.$^6$ ............................................. A47C 15/00
[52] U.S. Cl. ..................... 297/238; 297/216.11; 297/472
[58] Field of Search ................................ 297/238, 216.11, 297/216.13, 472, 463.1, 463.2

[56] References Cited

U.S. PATENT DOCUMENTS

| | | | |
|---|---|---|---|
| 3,957,303 | 5/1976 | Mauron | 297/216.11 |
| 4,046,420 | 9/1977 | de la Taille et al. | 297/216.11 |
| 4,596,420 | 6/1986 | Vaidya | 297/238 X |
| 4,681,367 | 7/1987 | Timmers | 297/238 X |
| 5,286,058 | 2/1994 | Wier | 297/472 X |

FOREIGN PATENT DOCUMENTS

| | | |
|---|---|---|
| 544032 | 8/1987 | Canada . |
| 2129266 | 8/1994 | Canada . |
| 1371788 | 4/1963 | France . |
| 2010236 | 2/1970 | France . |
| 2484935 | 6/1981 | France . |
| 2100676 | 1/1971 | Germany . |
| 2504203 | 8/1975 | Germany ............ 297/216.11 |

OTHER PUBLICATIONS

PCT/GB93/02460; Energy Absorber and Method of Absorbing Energy; Pub. Date: Jun. 9, 1994.

*Primary Examiner*—Laurie K. Cranmer
*Attorney, Agent, or Firm*—Gregory P. Brown

[57] ABSTRACT

An energy absorbing fastener apparatus is disclosed for fastening an integral child seat disposed within a primary passenger seat back of a primary passenger seat of a motor vehicle. The apparatus interconnects the child seat to a frame of the primary passenger seat back and includes a stress raiser to induce energy absorbing shearing and plastic deformation of the fastener apparatus.

13 Claims, 3 Drawing Sheets

ENERGY ABSORBING CHILD SEAT FASTENER

Field of the Invention

This invention relates to integrated child seats for use in motor vehicles. More particularly, the present invention relates to an energy absorbing plate used to secure an integrated child seat within a primary passenger seat of a motor vehicle.

DISCLOSURE INFORMATION

It is well known in the automotive seating art to construct a primary passenger seat with a fold out child seat mounted integrally therein. Generally these seats provide increased customer satisfaction by providing a readily available child seat without consuming desirable cargo capacity and eliminating the chore of removing and installing a conventional separate child seat as needed. In typical prior art constructions the child seat is rigidly secured to the frame of the primary passenger seat.

It is desirable to design an apparatus for securing an integral child seat to a primary passenger seat frame that provides an energy absorbing means that is independent from the structural characteristics of the frame of the primary passenger seat.

SUMMARY OF THE INVENTION

The present invention provides a primary passenger seat having an integral child seat. The primary seat includes frame structure that is constructed to absorb energy by plastic deformation when subjected to a load exceeding a first predetermined amount. An energy absorbing child seat fastener apparatus for fastening the integral child seat to the frame structure of the primary passenger seat is constructed to absorb energy by plastic deformation when subjected to a load exceeding a second predetermined amount, being substantially less than the first predetermined amount.

In the presently preferred embodiment, the fastener apparatus comprises an energy absorbing plate member having first and second tabs and first and second edges extending therebetween, and a center portion substantially midway between the first and second tabs. The first and second tabs being adapted to be fastened to the frame of the primary passenger seat. The center portion of the fastener apparatus is adapted to be fastened to the child seat. The fastener apparatus further includes a stress raiser disposed on the energy absorbing plate member. The energy absorbing plate member is operative to controllably absorb energy by shearing at the stress raiser upon application of a load to the center portion that is in excess of the second predetermined amount, which is substantially less than the first predetermined amount required to plastically deform the primary passenger seat frame.

Other objects, features and advantages of the present invention will become apparent to those skilled in the art from the drawings, detailed description and claims which follow.

DESCRIPTION OF THE PREFERRED EMBODIMENT

Figure 1:
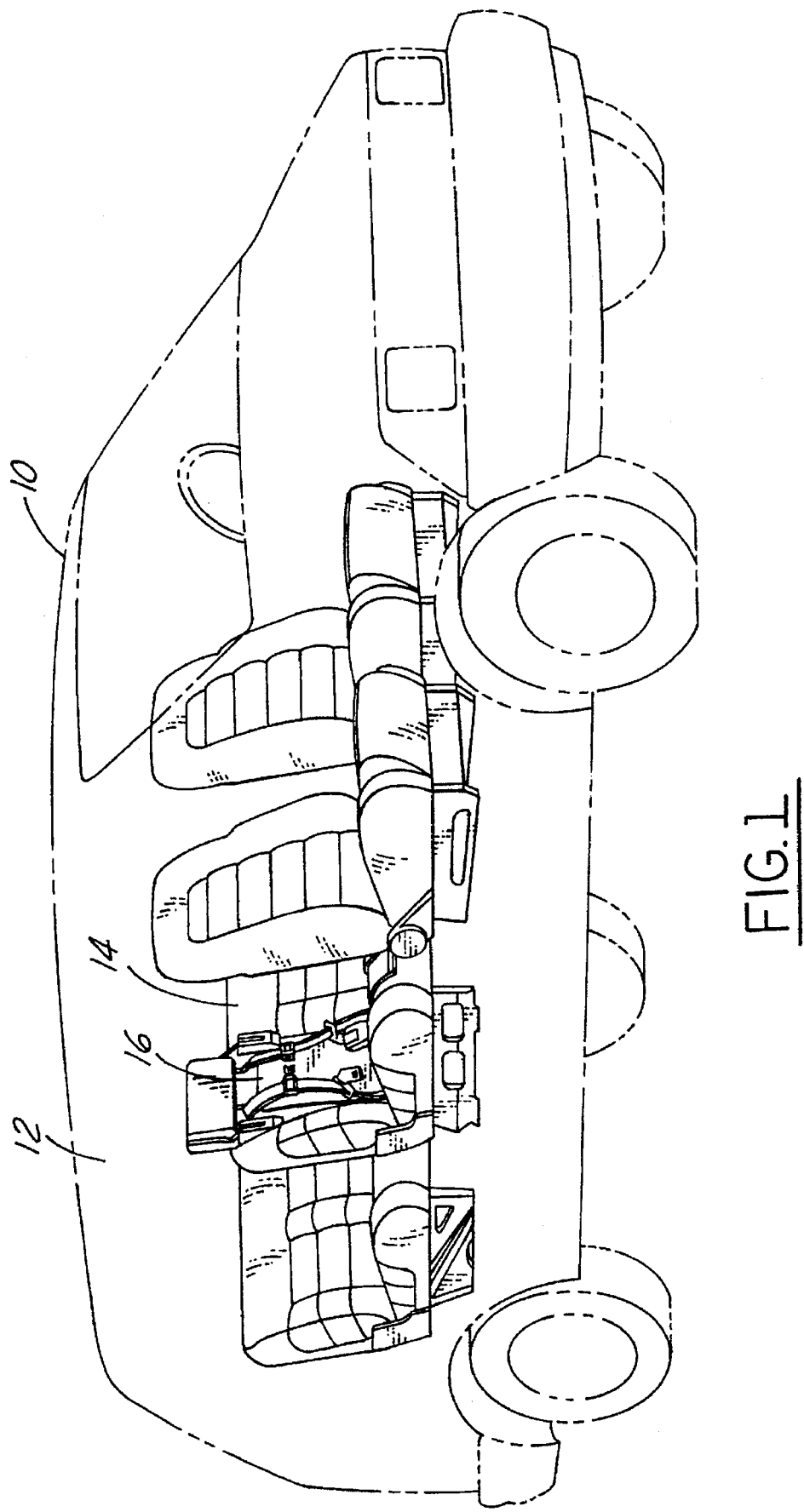
FIG. 1 is a perspective view of a motor vehicle illustrating a primary passenger seat including an integrated child seat according to the present invention.

Referring to FIG. 1, a motor vehicle 10 is shown having a passenger compartment 12 and several primary passenger seats. Specifically, a bench style primary passenger seat 14 includes an integrated fold out child seat 16 shown in the open position. The present invention, however, is not so limited, as the integrated child seat could alternatively be disposed in a bucket style primary passenger seat.

Figure 2:
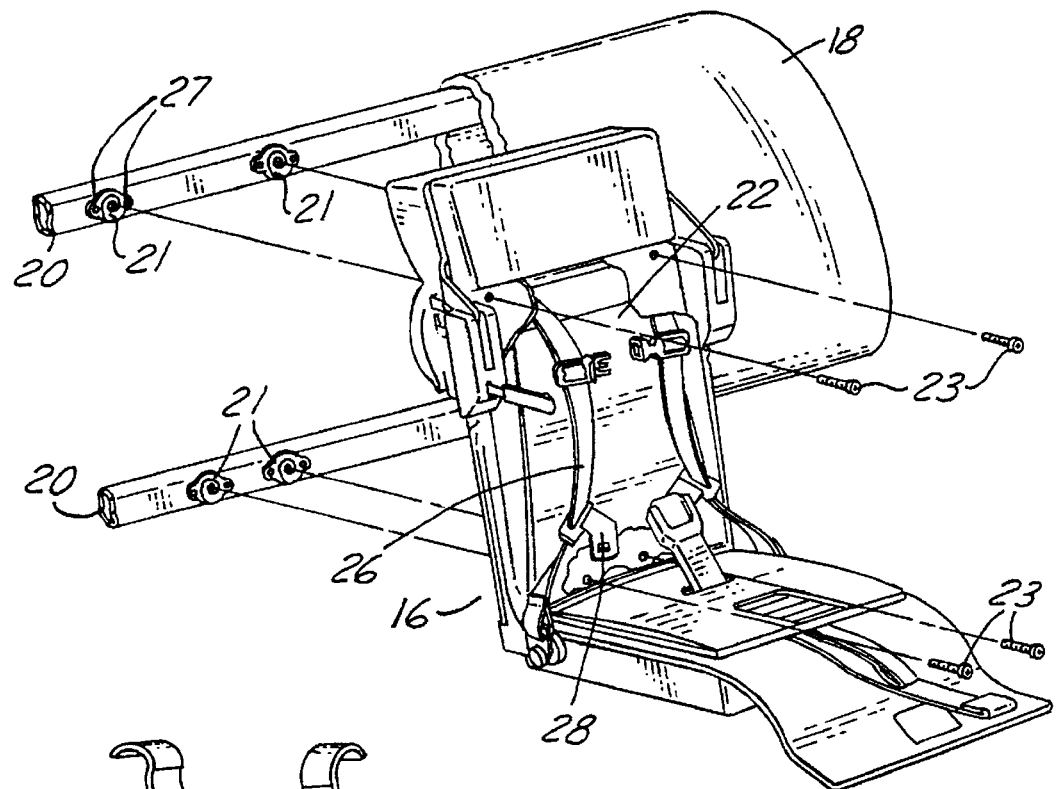
FIG. 2 is an exploded view illustrating a partial cut away of a primary passenger seat back and the attachment thereto of an integrated child seat according to the present invention.

FIG. 2 illustrates the child seat 16 and the primary passenger seat back 18 and its frame 20. The primary passenger seat frame 20 is constructed from round tubing, preferably metal. However, the frame 20 may consist of stamped and welded component assemblies or many alternative structures originally designed to fulfill the requirements of a primary passenger seat 14, such as a substantially rigid synthetic polymeric material, such as polypropylene. The frame 20 is constructed to absorb energy by plastic deformation under a load that exceeds a first predetermined minimum load.

Figure 4:
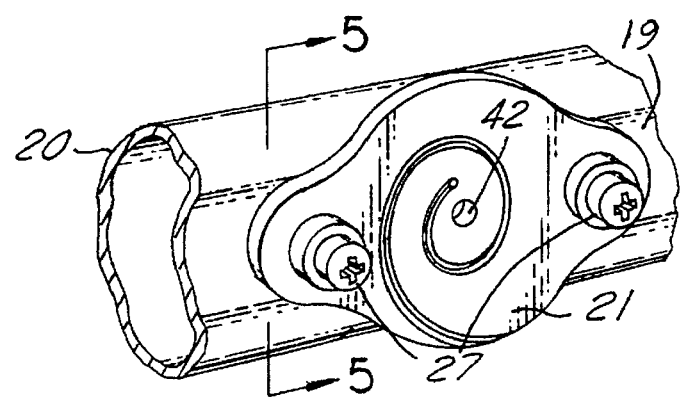
FIG. 4 is a perspective view illustrating an energy absorbing plate fastened to a frame of a primary passenger seat according to the present invention.
Figure 5:
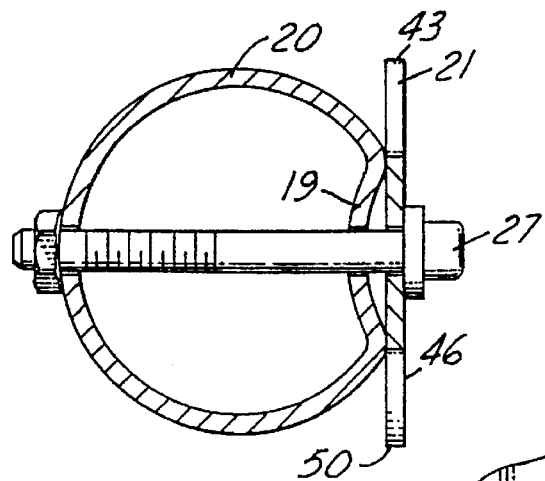
FIG. 5 is a sectional view taken from FIG. 4 illustrating an energy absorbing plate fastened to a frame of a primary passenger seat using a threaded rod fastener and a weld nut according to the present invention.
Figure 6:
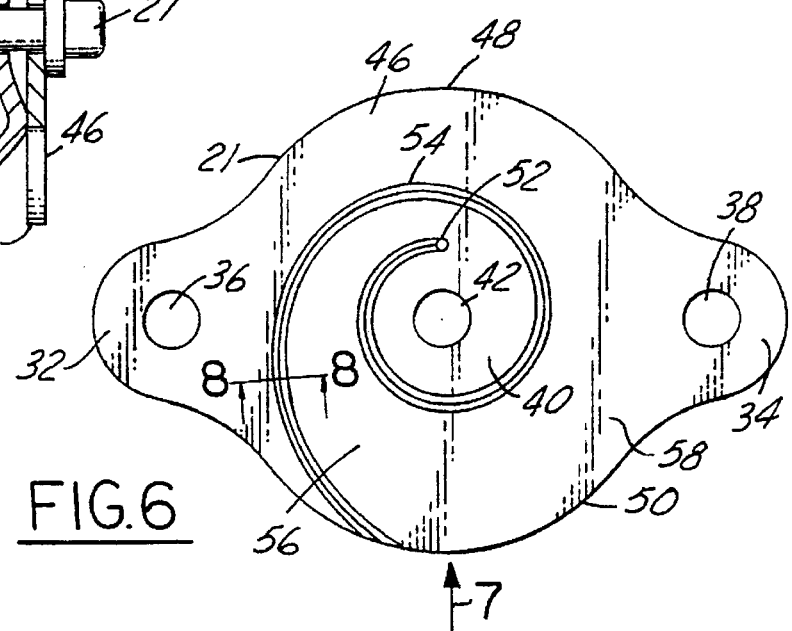
FIG. 6 front view of a energy absorbing plate impressed with a stress raiser consisting of a spiral groove and a stress aperture according to the present invention.

In the illustrated embodiment, four energy absorbing plates, 21 are attached. As can be seen in FIGS. 4 and 5, attachment may be facilitated by roll pressing the frame 20 in the areas where the energy absorbing plates 21 attach. Also shown in FIGS. 2,4, and 5, the energy absorbing plates 21 may be attached to the frame 20 using threaded fasteners 27 to engage a weld nut disposed on the frame 20. However, any variety of fastening techniques may be substituted, such as, welding or riveting.

As can be seen in FIG. 2, the four corresponding child seat threaded rod fasteners 23 secure the child seat 16 to corresponding energy absorbing plates 21 at aperture 42. The energy absorbing plate 21 may be provided with a weld nut at aperture 42 to engage the threaded fastener 23. As will be described more fully below, the total number of energy absorbing plates 21 used to secure the child seat 16 to the primary passenger seat 14 depends on the energy absorption requirements for the particular design. As such, this illustration is not intended to be a limitation upon the present invention, as any number of energy absorbing plates 21 may be indicated.

Figure 3:
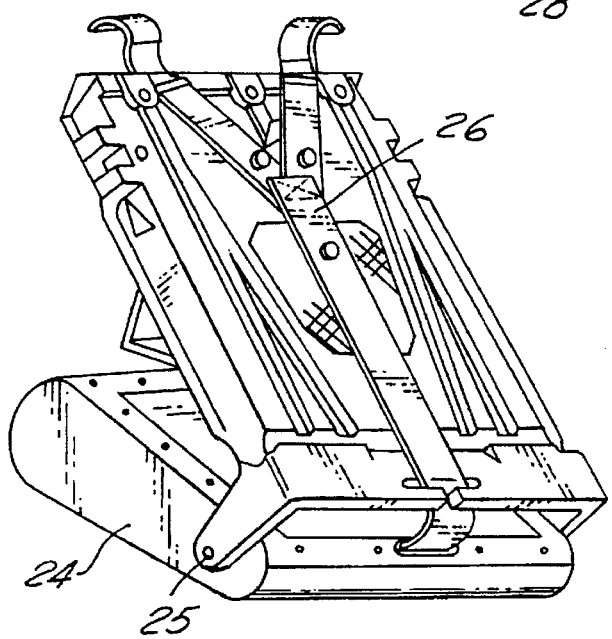
FIG. 3 is a rear perspective view illustrating a restraint system and its routing through an integrated child seat back into an integrated child seat cushion according to the present invention.

Referring to FIGS. 2 and 3, the child seat 16 is also of conventional design including a child seat back 22 and a child seat cushion 24. A hinge 25 permits the child seat cushion 24 to pivot from a stored position within the primary passenger seat back 18 to an open position. The child seat 16 also has a conventional child restraint 26 including a mating tongue and buckle assembly 28, and a restraint belt tensioner (not shown) disposed within the child seat cushion 24. The tensioner may comprise any of those systems commonly known to those skilled in the art, such as a cinch or retractor mechanism.

Figure 7:
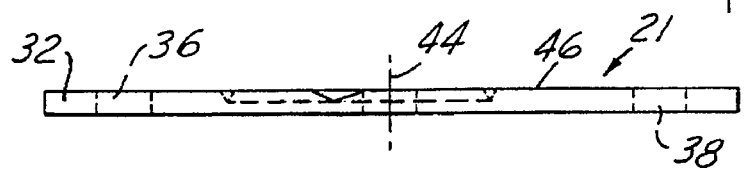
FIG. 7 is an elevational view of the energy absorbing plate of FIG. 6.
Figure 8:
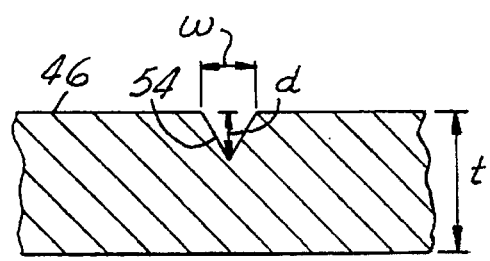
FIG. 8 is a section view illustrating a spiral groove impressed of one face of the energy absorbing plate according to the present invention.
Figure 9:
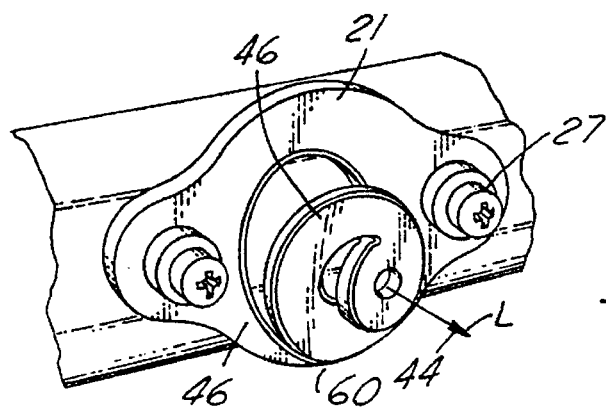
FIG. 9 is a perspective view illustrating a helix formed after the plastic deformation of the energy absorbing plate according to the present invention.

Referring now to FIGS. 7, 8 and 9, the energy absorbing plate 21 will be more fully described. The energy absorbing plate 21 has a generally circular shape, with two tabs 32, 34 disposed at opposite ends. Tabs 32, 34 include apertures 36, 38 for mounting to the frame 20. The present invention is stamped preferably a planar or member, however, the present invention is not so limited. For instance, the energy absorbing plate 21 could be conformed to the curvature of the underlying frame 20.

The energy absorbing plate 21 further includes a center portion 40 having a center aperture 42 therethrough with a central axis 44 that is perpendicular to a first face 46 of the energy absorbing plate 21. The central axis 44 is substantially midway between the tabs 32, 34. The periphery of the energy absorbing plate 21 includes upper and lower edges, 48 and 50 respectively, extending between tabs 32, 34.

The first face 46 includes a stress raiser impressed thereon. The stress raiser may consist of a notch, hole or other discontinuity in the first face 46 which causes a localized stress concentration when a load is imposed upon it. The illustrated embodiment includes the combination two stress raisers, a stress aperture 52 and a spiral groove 54, however the invention is not so limited. Any stress raiser, alone or in combination, would provide the desired stress concentration at a predetermined location.

Referring to FIGS. 7 and 9, the spiral groove 54 stress raiser of the present embodiment provides three unique features. The first feature is the relationship between the depth of the spiral groove 54, and the amount of energy required to initiate shearing of the energy absorbing plate 21. As the depth of the spiral groove 54 increases, the energy required to initiate shearing decreases. The depth of the spiral groove 54 may range from about 0.01 mm, to a substantial notch, equal in depth to over 50% of the thickness of the energy absorbing plate 21. In the illustrated embodiment, the energy absorbing plate 21 has a thickness, 't', of 3.0 mm. (range 2–5) The notch of the spiral groove 54 has a depth, 'd', of 1.0 mm and a width, 'w', of 0.5 mm.

A second feature of the spiral groove 54 is the relationship between the length of spiral groove 54 and the total energy absorption capacity of the energy absorbing plate 21. The longer the spiral groove 54, the more energy can be absorbed. Generally, the spiral groove 54 extends from a point close to the center aperture 42 in the center portion 40 to a point on either of the upper or lower edges 48, 50.

The third feature of the spiral groove 54 is a spiral band 56 defined by succeeding revolutions of the spiral groove 54. The spiral band 56 extends from the center portion 40 and terminates at a base portion 58. There is a relationship between the width of the spiral band 56 and the amount of energy that will be absorbed by the energy absorbing plate 21. The greater the width of the spiral band 56, the greater the energy that will be absorbed. The base portion 58 has a predetermined width capable of supporting a predetermined maximum load without exceeding the elastic limit of the spiral band 56 at the base portion 58.

The energy absorbing plate 21 is preferably stamped a high strength sheet steel, such as SAE 950x. The energy absorbing plate 21 may be constructed from any metal having the desired energy absorbing characteristics for a particular design, including, but not limited to steel, aluminum, or a composites of steel, aluminum and other materials. This method of manufacture advantageously permits forming the apertures 36, 38, the center aperture 42, and the stress raisers in one simple stamping operation.

Referring to FIG. 9, operation of the present invention will now be described. Application of a forwardly directed load to the child seat back generates a tension force in the child seat threaded rod fasteners 23. This force is substantially normal to the first face 46 of the energy absorbing plate 21. As this force exceeds a predetermined limit, stress in the energy absorbing plate 21 concentrates at the stress aperture 52 until it exceeds the plastic limit for the selected material. The material begins to shear at the stress aperture 52 and as long as the applied load exceeds the predetermined limit the energy absorbing plate 21 continues to shear along the spiral groove 54 and the center portion 40 pulls out of the plane of the first face 46. If the load continues to exceed the predetermined limit, the center portion 40 progressively deforms the spiral band 56 into a helix 60. If the load continues the spiral band 56 eventually completely separates at the end of the spiral groove 54 where the base portion 58 operates to prevent further movement of the child seat from the primary passenger seat.

It should be readily apparent to those skilled in the art, based on the teaching herein, that the adjustability of the energy absorbing capacity of the present invention provides substantial advantages when integrating a child seat 16 into a primary passenger seat 14. By decoupling the child seat 16 energy absorption from the primary passenger seat frame 20, the child seat energy absorption can be optimized independently from the design of the energy absorbing primary passenger seat frame 20. Adjustment of the energy absorbing plate 21 may be performed through various design parameters. For instance, the choice of the thickness, material, from which the energy absorbing plate 21 is constructed affects the energy absorption capacity. Furthermore, the choice of stress raiser provides additional energy absorption capacity. In the illustrated embodiment, the stress raiser consists of a combination of the stress aperture 56 and the spiral groove 54. These stress raisers provide additional energy absorbing tuning parameters, such as the depth, width and length of the spiral groove and the width or cross-sectional area of the stress aperture 56.

Various other modifications and permutations of the present invention, no doubt, will occur to those skilled in the art. Therefore, it is the following claims, including all equivalents, which define the scope of the present invention.

What is claimed is:

1. A passenger seating apparatus for use within a passenger compartment of a motor vehicle, said passenger seating apparatus comprising:

a primary passenger seat having a frame structure constructed to absorb energy by plastic deformation when subjected to a load exceeding a first predetermined amount;

a child seat integrally disposed within said primary passenger seat;

an energy absorbing plate member adapted to interconnect said primary passenger seat and said child seat; and a groove disposed on said energy absorbing plate member, said groove being operative to controllably absorb energy by inducing said energy absorbing plate member to shear along said groove when subjected to a load exceeding a second predetermined amount, said second predetermined amount being substantially less than the first predetermined amount.

2. A child seat fastener apparatus for fastening an integral child seat within a primary passenger seat in a passenger compartment of a motor vehicle, said fastener apparatus comprising:

an energy absorbing plate member having first and second tabs and first and second edges extending therebetween, and a center portion substantially midway between said first and second tabs;

said first and second tabs having apertures to receive threaded fasteners therethrough for fastening to said primary passenger seat;

said center portion having an aperture to receive a threaded fastener therethrough for fastening to said child seat; and a stress raiser disposed on said energy absorbing plate member, said stress raiser being operative to controllably absorb energy by inducing said energy absorbing plate member to shear at said stress raiser upon application of a force to said center portion in excess of a predetermined limit.

3. A child seat fastener apparatus according to claim 2, wherein said stress raiser further comprises a stress aperture disposed a predetermined distance from said center portion and passing through said energy absorption plate.

4. A child seat fastener apparatus according to claim 2, wherein said stress raiser further comprises a spiral groove in a first face of said plate member, said spiral groove having an inner end disposed a predetermined distance from said center portion and extending to an outer end at a predetermined point on one of said edges, said spiral groove defining a spiral band between succeeding rings of said spiral groove.

5. A child seat fastener apparatus according to claim 4, wherein said spiral band forms a helix upon application of a predetermined force substantially normal to said first face, said helix being connected to said second tab by a base portion having a predetermined minimum width.

6. A child seat fastener apparatus according to claim 4, wherein said stress raiser further comprises a stress aperture disposed at said inner end of said stress raiser.

7. A passenger seating apparatus for use in a passenger compartment of a motor vehicle, said passenger seating apparatus comprising:

a primary passenger seat securely disposed within the passenger compartment including a primary passenger seatback;

a child seat integrally disposed within said primary seat and having a child seat back;

an energy absorbing plate member adapted to interconnect said primary passenger seat back and said child seat back; and a stress raiser disposed on said energy absorbing plate member, said stress raiser being operative to controllably absorb energy by inducing said energy absorbing plate member to shear at said stress raiser upon application of a force to said center portion in excess of a predetermined limit.

8. A passenger seating apparatus according to claim 7, wherein said energy absorbing fastener is disposed between a child seat back of the child seat and a frame member within said primary passenger seat back of the primary passenger seat.

9. A passenger seating apparatus according to claim 8, wherein said energy absorbing plate member further comprises:

first and second tabs and first and second edges extending therebetween, and a center portion substantially midway between said first and second tabs;

said first and second tabs being adapted to be fastened to said frame member of said primary passenger seat back;

said center portion being adapted to be fastened to said child seat back.

10. A passenger seating apparatus according to claim 9, wherein said stress raiser further comprises a stress aperture disposed a predetermined distance from said center portion and passing through said energy absorption plate.

11. A passenger seating apparatus according to claim 9, wherein said stress raiser further comprises a spiral groove in a first face of said plate member, said spiral groove having an inner end disposed a predetermined distance from said center portion and extending to an outer end at a predetermined point on one of said edges, said spiral groove defining a spiral band between succeeding rings of said spiral groove.

12. A child seat fastener apparatus according to claim 11, wherein said spiral band forms a helix upon application of a predetermined force normal to said first face, said helix being connected to said second tab by a base portion having a predetermined minimum width.

13. A child seat mounting apparatus according to claim 11, wherein said stress raiser further comprises a stress aperture disposed at said inner end of said stress raiser.

* * * * *